United States Patent Office 3,341,625
Patented Sept. 12, 1967

3,341,625
PHOSPHINE OXIDES AS FLAME-RETARDANT AGENTS FOR THERMOPLASTIC PRODUCTS
Helen Currier Gillham, Princeton, N.J., and Allan Ellis Sherr, Norwalk, Conn., assignors to American Cyanamid Company, Stamford, Conn., a corporation of Maine
No Drawing. Filed Sept. 15, 1966, Ser. No. 579,506
10 Claims. (Cl. 260—887)

This application is a continuation-in-part of our co-pending application, Ser. No. 316,497, filed Oct. 16, 1963, now abandoned.

This invention relates to flame-retardant compositions. More particularly, this invention relates to flame-retardant compositions comprising thermoplastic polymers containing a flame-retarding amount of a phosphine oxide or sulfide. More particularly, this invention relates to flame-retardant compositions comprising thermoplastic polymers containing a flame-retarding amount of a compound having the formula (I)

wherein R, $R^1$ and $R^2$ are, individually (A) hydrogen, (B) saturated, branched, straight chain or cyclic alkyl radicals having from 1–6 carbon atoms, inclusive, (C) cyano substituted alkyl radicals having 1–6 carbon atoms, inclusive, (D) aryl radicals of 6–10 carbon atoms, inclusive, (E) aralkyl radicals of 7–11 carbon atoms, inclusive, and (F) halo and polyhalo substituted aralkyl radicals of 7–11 carbon atoms, inclusive, and X is oxygen or sulfur, no more than one of R, $R^1$ and $R^2$ being hydrogen.

The use of various materials incorporated into thermoplastic resins in order to improve the flame-retardance thereof has been known in the prior art. Many materials are commercially available for such a use, among them being chlorostyrene copolymers, chlorinated paraffin wax with triphenyl stibine, chlorinated paraffins and aliphatic antimonyl compounds as well as antimony oxide-chlorinated hydrocarbon mixtures. A drawback, however, of these compounds has been the fact that generally a large amount, i.e. upwards of 35%, of additive must be incorporated into the resin in order to make it sufficiently flame-retardant. Also these prior art additives tend to crystallize or oil out of the resin after a relatively short time of incorporation. We have now found a group of compounds which may be added to thermoplastic resins in relatively small amounts and still result in the production of satisfactory flame-retardant compositions while not crystallizing or oiling out of the resin after incorporation therein.

The production of thermoplastic resin compositions which are flame-retardant, i.e. have high resistance to heat, is of considerable commercial importance. For example, such articles as castings, moldings, foamed or laminated structures and the like are required, or at least desired, to be resistant to fire and flame and to possess the ability to endure heat without deterioration. Typical illustrations of such applications can be found in castings for live electrical contacts which should not be ignited or deteriorated by heat and sparks. Structural members such as pipes, wall coverings, wall paneling, windows and items such as ash trays, waste baskets, fibers and the like are further examples of products wherein flame-retardance is desirable.

It is therefore an object of the present invention to provide novel flame-retardant thermoplastic resin compositions.

It is a further object of the present invention to provide flame-retardant compositions comprising thermoplastic polymers and a flame-retarding amount of a compound represented by Formula I.

These and further objects will become more apparent to those skilled in the art upon reading the more detailed description set forth hereinbelow.

*The thermoplastic polymers*

The thermoplastic polymers into which the flame-retardant agents may be incorporated to produce the novel compositions of the present invention, are generally the vinyl type polymers wherein the monomeric material is polymerized, by any known method, via the vinyl unsaturation therein. Examples of the vinyl type polymers which may be used to form our novel compositions are the vinyl halides, the vinylidene halides, vinyl acetate, polyvinyl butyral, butadiene copolymers, acrylonitrile-butadiene-styrene polymers, the acrylonitriles, etc. Additionally and preferably, one may incorporate the flame-retardant agents mentioned above into such polymers as the α-olefin polymers, such as the homopolymers and copolymers etc. containing, as the major constituent, ethylene, propylene, and the like and the acrylates and methacrylate polymers produced from monomers having the formula (II)

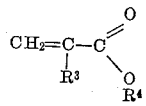

wherein $R^3$ is a hydrogen or methyl radical and $R^4$ is a hydrogen or an alkyl radical having from 1 to 6 carbon atoms, inclusive. Examples of monomers represented by Formula II include acrylic acid, methyl acrylate, ethyl acrylate, n-propyl acrylate, isopropyl acrylate n-butyl acrylate, t-butyl acrylate, isobutyl acrylate, n-amyl acrylate, t-amyl acrylate, hexyl acrylate and their corresponding methacrylates.

Additional examples of monomers which may be used to form the thermoplastic polymers encompassed by the present invention, polymerized either singularly or in combination with each other or with the other compounds set forth hereinabove, are such monomers as the unsaturated alcohol esters, more particularly the allyl, methallyl, vinyl, methvinyl, butenyl, etc., unsaturated esters of aliphatic and aromatic monobasic acids such, for instance, as acetic, propionic, butyric, crotonic, succinic, glutaric, adipic, maleic, fumaric, itaconic, benzoic, phthalic, terephthalic, benzoylphthalic, etc., acids; the saturated monohydric alcohol esters, e.g., the methyl, ethyl, propyl, isopropyl, butyl, sec.-butyl, amyl, etc., esters of ethylenically unsaturated aliphatic monobasic acids, illustrative examples of which appear above; vinyl cyclic compounds (including monovinyl aromatic hydrocarbons), e.g., styrene, o-, m-, and p-chlorostyrenes, -bromostyrenes, -fluorostyrenes, -methylstyrenes, -ethylstyrenes, -cyanostyrenes, the various poly-substituted styrenes such, for example, as the various di-, tri-, and tetra-chlorostyrenes, -bromostyrenes, -fluorostyrenes, -methylstyrenes, -ethylstyrenes, -cyanostyrenes, etc., vinyl pyridine, divinyl benzene, diallyl benzene, the various allyl cyanostyrenes, the various alpha-substituted styrenes and alpha-substituted ring-substituted styrenes, e.g., alpha-methyl styrene, alpha-methyl-para-methyl styrene, etc.; unsaturated ethers, e.g., ethyl vinyl ether, diallyl ether, etc.; unsaturated amides, for instance, N-allyl caprolactam, acrylamide and N-substituted acrylamides, e.g., N-methylol acrylamide, N-allyl acrylamide, N-methyl acrylamide, N-phenyl acrylamide, etc.; unsaturated ketones, e.g., methyl vinyl ketone, methyl allyl ketone, etc.; methylene malonic esters, e.g., methylene methyl malonate, etc. and ethylene. Other examples of monomers that can be used as polymers to form the resin portion of our novel flame-retardant compositions are the vinyl halides, more particularly, vinyl fluoride, vinyl chloride, vinyl bromide and vinyl iodide, and the various vinylidene compounds, including the vinylidene halides, e.g., vinylidene chloride, vinylidene bromide, vinylidene fluoride, and vinylidene iodide, other comonomers being added, if needed, in order to improve the compatibility and copolymerization characteristics of the mixed monomers.

More specific examples of allyl compounds that can be polymerized to useful polymers, that is, useful in the production of our novel flame-retardant compositions, are allyl methacrylate, allyl alcohol, methallyl alcohol, diallyl carbonate, allyl lactate, allyl alphahydroxyisobutyrate, allyl trichlorosilane, diallyl phthalate, diallyl methylgluconate, diallyl tartronate, diallyl tartrate, diallyl mesaconate, the diallyl ester of muconic acid, diallyl chlorophthalate, diallyl dichlorosilane, the diallyl ester of endomethylene tetrahydrophthalic anhydride, triallyl tricarballylate, triallyl cyanurate, triallyl citrate, triallyl phosphate, tetrallyl silane, tetrallyl silicate, hexallyl disiloxane, allyl diglycol carbonate, etc. Other examples of allyl compounds that may be employed are given, for example, in U.S. Patent No. 2,510,503, issued June 6, 1950.

These above mentioned monomers may be polymerized, copolymerized, etc., in any known manner such as by free-radical generating catalysts, irradiation, anion and cation type catalysts and the like, said method of polymerization forming no part of the present invention.

The phosphine oxides and sulfides

As mentioned above, we have discovered the addition of various phosphine oxides and sulfides to thermoplastic resins results in the production of resinous compositions having excellent flame-retardant properties. According to the present invention, those phosphine oxides or sulfides represented by Formula I are used for this purpose. The phosphine oxides or sulfides may be incorporated into the resins in flame-retarding amounts, i.e. generally amounts ranging from about 5%, by weight, to about 35%, by weight, preferably 15% to 25%, by weight, based on the weight of the polymer, have been found sufficient. A preferred group of flame-retarding compounds useful in producing our novel compositions are those wherein at least two of R, $R^1$ or $R^2$ are cyanoalkyl, cycloalkyl, aralkyl or aryl radicals.

These phosphine oxides and sulfides can be incorporated into the resin by any known method. That is to say, the flame-retardant additive may be combined with the resin by milling the resin and the additive on, for example, a two-roll mill, in a Banbury mixer, etc., or the oxide or sulfide may be added by molding it and the resin simultaneously, extruding it and the resin or by merely blending the resin in powder form with the oxide or sulfide and thereafter forming the final desired article. Additionally, the phosphine oxide or sulfide also may be added during the resin manufacture, i.e., during the monomer polymerization procedure, provided the catalyst etc. and other ingredients of the polymerization system are inert thereto.

The phosphine oxides and sulfides set forth hereinabove may be produced in any known manner without varying from the scope of the present invention. Various methods for the production of oxides and sulfides of this type are disclosed in, for example, U.S. Patents 3,067,258, and 3,099,684; Peters et al., J. Am. Chem. Soc., Volume 82, page 4751, 1960 and Buckler et al., Volume 82, page 2076, 1960; Buckler et al., J. Am. Chem. Soc., Volume 83, page 168, 1961; Screttas et al., J. Org. Chem., Volume 27, page 2573, 1962; Rauhut et al., J. Org. Chem., Volume 26, page 4626, 1961 and these articles and patents are hereby incorporated herein by reference.

Generally, one procedure for the production of the phosphine oxides comprises mildly refluxing an alcoholic solution of a compound of the formula (III) 

wherein R, $R^1$ and $R^2$ are as defined above in regard to Formula I, in the presence of oxygen and/or hydrogen peroxide. The reaction is kept at reflux by the use of, e.g., Dry Ice and the resultant phosphine oxide may be isolated by filtration solvent evaporation, etc. The sulfides may also be prepared as set forth in Kosolapoff, Organophosphorus Compounds, John Wiley & Sons, Inc., Publishers, New York, N.Y., pages 98 and 99, 1950. Yields usually are from 50% to 100% of the theoretical, said procedures, however, forming no part of the present invention.

Examples of compounds which are represented by Formula I and are therefore useful in producing the novel compositions of the present invention, include:

trimethylphosphine oxide and sulfide,
triethylphosphine oxide and sulfide,
tri-n-propylphosphine oxide and sulfide,
triisopropylphosphine oxide and sulfide,
tri-n-butylphosphine oxide and sulfide,
triisobutylphosphine oxide and sulfide,
tri-t-butylphosphine oxide and sulfide,
triamylphosphine oxide and sulfide,
tri-n-hexylphosphine oxide and sulfide,
tricyclohexylphosphine oxide and sulfide,
tris(cyanomethyl)phosphine oxide and sulfide,
tris(2-cyanoethyl)phosphine oxide and sulfide,
tris(1-cyanoethyl)phosphine oxide and sulfide,
tris(1-cyanopropyl)phosphine oxide and sulfide,
tris(2-cyanopropyl)phosphine oxide and sulfide,
tris(3-cyanopropyl)phosphine oxide and sulfide,
tris(2-cyano-1-methylethyl)phosphine oxide and sulfide,
tris(1-cyanobutyl)phosphine oxide and sulfide,
tris(2-cyano-1-methylpropyl)phosphine oxide and sulfide,
tris(4-cyanobutyl)phosphine oxide and sulfide,
tris(5-cyanopentyl)phosphine oxide and sulfide,
tris(6-cyanohexyl)phosphine oxide and sulfide,
triphenylphosphine oxide and sulfide,
tritolylphosphine oxide and sulfide,
trixylylphosphine oxide and sulfide,
trinaphthylphosphine oxide and sulfide,
tribenzylphosphine oxide and sulfide,
tris(2-phenethyl)phosphine oxide and sulfide,
tris(3-phenylpropyl)phosphine oxide and sulfide,
tris(4-phenylbutyl)phosphine oxide and sulfide,
tris(2-tolylethyl)phosphine oxide and sulfide,
tris(tolylmethyl)phosphine oxide and sulfide,
tris(3-xylylpropyl)phosphine oxide and sulfide,
tris(naphthylmethyl)phosphine oxide and sulfide,
tris(α-chlorobenzyl)phosphine oxide and sulfide,
tris(1-chloro-2-phenethyl)phosphine oxide and sulfide,
tris(2-phenyl-2-bromoethyl)phosphine oxide and sulfide,
tris(3-tolyl-1-iodopropyl)phosphine oxide and sulfide,
tris(4-phenyl-2-fluorobutyl)phosphine oxide and sulfide,
tris(1,1-dichloro-2-phenethyl)phosphine oxide and sulfide,
tris(1,1-dibromo-3-phenylpropyl)phosphine oxide and sulfide,
tris(1,1-diiodo-4-phenylbutyl)phosphine oxide and sulfide,
tris(1,2-difluoro-2-phenethyl)phosphine oxide and sulfide,
dimethylphosphine oxide and sulfide,
diethylphosphine oxide and sulfide,
di-n-propylphosphine oxide and sulfide,
diisopropylphosphine oxide and sulfide,
di-n-butylphosphine oxide and sulfide,
di-t-butylphosphine oxide and sulfide,
diisobutylphosphine oxide and sulfide,
dicyclohexylphosphine oxide and sulfide,
bis(2-cyanopropyl)phosphine oxide and sulfide,
bis(2-cyano-1-methylethyl)phosphine oxide and sulfide, bis(1-cyanobutyl)phosphine oxide and sulfide,
bis(6-cyanohexyl)phosphine oxide and sulfide,
diphenylphosphine oxide and sulfide,
ditolylphosphine oxide and sulfide,
dixylylphosphine oxide and sulfide,
dinaphthylphosphine oxide and sulfide,
dibenzylphosphine oxide and sulfide,
bis(2-phenethyl)phosphine oxide and sulfide,
bis(3-phenylpropyl)phosphine oxide and sulfide,
bis(4-phenylbutyl)phosphine oxide and sulfide,
bis(2-tolylethyl)phosphine oxide and sulfide,
bis(tolylmethyl)phosphine oxide and sulfide,
bis(3-xylylpropyl)phosphine oxide and sulfide,
bis(naphthylmethyl)phosphine oxide and sulfide,
bis(α-bromobenzyl)phosphine oxide and sulfide,
bis(1-chloro-2-phenethyl)phosphine oxide and sulfide,
bis(2-phenyl-2-bromoethyl)phosphine oxide and sulfide,
bis(3-tolyl-1-iodopropyl)phosphine oxide and sulfide,
bis(4-phenyl-2-fluorobutyl)phosphine oxide and sulfide,
bis(1,1-dichloro-2-phenethyl)phosphine oxide and sulfide,
bis(1,1-dibromo-3-phenylpropyl)phosphine oxide and sulfide,
bis(1,1-diiodo-4-phenylbutyl)phosphine oxide and sulfide,
bis(1,2-difluoro-2-phenethyl)phosphine oxide and sulfide,
di-t-butyl-1-cyanopropylphosphine oxide and sulfide,
bis(5-cyanopentyl)isopropylphosphine oxide and sulfide,
bis(naphthylmethyl)cyclohexylphosphine oxide and sulfide,
bis(1,1-diiodo-4-phenylbutyl)methylphosphine oxide and sulfide, and the like.

It is also within the scope of the present invention to incorporate such ingredients as plasticizers, dyes, fillers, pigments, stabilizers, lubricants, antioxidants, antistatic agents and the like to our novel compositions.

The following examples are set forth for purposes of illustration only and are not to be construed as limitations on the present invention except as set forth in the appended claims. All parts and percentages are by weight unless otherwise specified.

Any appropriate flame-retardance test may be used to determine the flame-retardance properties of any specific compound. One test which is reasonably efficient is that designated as a modified version of ASTM test D-635-56T. The specifications for this test are: a specimen, 5″ in length, 0.5″ in width and 0.045″ in thickness, is marked at the 1″ and 4″ lengths and is then supported with its longitudinal axis horizontal and its transverse axis inclined at 45° to the horizontal. A Bunsen burner with a 1″ blue flame is placed under the free end of the strip and is adjusted so that the flame tip is just in contact with the strip. At the end of 30 seconds, the flame is removed and the specimen is allowed to burn. If the specimen does not continue to burn after the first ignition it is immediately recontacted with the burner for another 30 second period. If, after the two burnings, the strip is not burned to the 4″ mark, the specimen is designated as "self-extinguishing" or "flame-retardant."

EXAMPLE 1

Eighty-five parts of polyethylene and 15 parts of tribenzylphosphine oxide are milled together on a two roll mill at about 170° C. The resulting milled composition is molded into strips 5″ in length, 0.5″ in width and 0.45″ in thickness and said strips are then subjected to an art recognized flame-retardance test. The strips pass the test and are therefore designated as flame-retardant.

Following the procedure of Example 1, the following examples were carried out utilizing different flame-retardant agents and various thermoplastic resin polymers. The results of these examples are set forth in Table I, below. In each instance, the resultant plastic-phosphine oxide or sulfide mixture passed the flame-retardance test and was designated as flame and fire-retardant. In the table PE=polyethylene; PP=polypropylene; PMMA=poly(methyl methacrylate); PA=poly(acrylic acid); AN=acrylonitrile; ST=styrene; BD=butadiene; PS=polystyrene.

TABLE I

| Ex. | Polymer | Flame-Retardant | | | X | Percent |
| --- | --- | --- | --- | --- | --- | --- |
| | | R | R¹ | R² | | |
| 2 | PE |  |  |  | O | 15 |
| 3 | PMMA |  |  |  | O | 5 |
| 4 | PE |  |  |  | S | 15 |
| 5 | PMMA |  |  |  | S | 10 |
| 6 | PMMA |  | CH₂CH₂CN | CH₂CH₂CN | O | 10 |
| 7 | PE |  | CH₂CH₂CN | CH₂CH₂CN | S | 25 |
| 8 | PMMA |  |  |  | O | 15 |
| 9 | PMMA | —CH₂ | —CH₂ | —CH₂ | O | 15 |
| 10 | PE | —CH₃ | —CH₂ | CH₃ | O | 15 |
| 11 | PE | —CH₂ | —CH₂ | H | O | 10 |

TABLE I—Continued

| Ex. | Polymer | Flame-Retardant | | | | Percent |
|---|---|---|---|---|---|---|
| | | R | R¹ | R² | X | |
| 12 | PE | Cl-C6H3(Cl)-CH2- | Cl-C6H3(Cl)-CH2- | Cl-C6H3(Cl)-Cl | O | 15 |
| 13 | PMMA | Cl-C6H3(Cl)-CH2- | Cl-C6H3(Cl)-CH2- | Cl-C6H3(Cl)-Cl | S | 20 |
| 14 | PE | Cl-C6H4-CH2- | Cl-C6H4-CH2- | Cl-C6H4-CH2- | O | 20 |
| 15 | PE | Cl-C6H4-CH2- | Cl-C6H4-CH2- | Cl-C6H4-CH2- | S | 25 |
| 16 | PE | Br-C6H4- | NCCH2CH2- | NCCH2CH2- | O | 20 |
| 17 | PMMA | C6H5- | C6H5- | (CH3CH2)2CH- | O | 25 |
| 18 | PE | C6H5- | C6H5- | C6H5- | O | 25 |
| 19 | PMMA | C6H5- | C6H5- | C6H5- | S | 20 |
| 20 | PE | NCCH2CH2- | NCCH2CH2- | H | O | 25 |
| 21 | PMMA | CH3CH2CH2CH2- | CH3CH2CH2CH2- | CH3CH2CH2CH2- | O | 25 |
| 22 | PE | C6H5- | C6H5- | (CH3)2CHCH2- | O | 30 |
| 23 | PE | C6H5- | C6H5- | C6H5- | O | 30 |
| 24 | PE | C6H5-CH2- | C6H5-CH2- | C6H5-CH2- | S | 20 |
| 25 | PE | C6H5-CH2- | C6H5-CH2- | C6H5-CH2- | O | 30 |
| 26 | PMMA | C6H5- | C6H5- | H | O | 25 |
| 27 | PMMA | C6H5- | C6H5- | C6H4-CH(CH3)- | O | 20 |
| 28 | PE | C6H5- | C6H5- | C6H4-CH(CH3)- | S | 20 |
| 29 | PMMA | C6H5- | C6H5- | CH3CH2CH2CH2- | O | 20 |
| 30 | PE | C6H5- | C6H5- | CH3CH2CH2CH2- | S | 25 |
| 31 | PE | C6H5- | C6H5- | CH3CH2CH2CH2CH2CH2- | O | 30 |
| 32 | MMA/ST/AN, 71/19/10 | C6H5- | C6H5- | (CH3)2CH- | O | 20 |
| 33 | MMA/ST/AN, 71/19/10 | C6H5- | C6H5- | (CH3)2CH- | S | 25 |
| 34 | PE | C6H5-CH2- | C6H5-CH2- | H | S | 10 |
| 35 | PE | C6H5- | | H | O | 15 |

TABLE I—Continued

| Ex. | Polymer | Flame-Retardant | | | | Percent |
|---|---|---|---|---|---|---|
| | | R | R¹ | R² | X | |
| 36 | PMMA | phenyl | phenyl | H | S | 15 |
| 37 | Mixture of BD-AN (10-75%) and AN-ST (25-90%).* | H | $CH_3(CH_2)_5$ | $CH_3$ | O | 25 |
| 38 | PP | $NC(CH_2)_6$ | H | phenyl | S | 25 |
| 39 | PE | phenyl-$(CH_2)_4$ | H | $C_2H_5$ | O | 25 |
| 40 | PE | $NCCH_2CH_2$ | $NCCH_2CH_2$ | $NCCH_2CH_2$ | O | 30 |
| 41 | PA | naphthyl-$CH_2$ | naphthyl-$CH_2$ | naphthyl-$CH_2$ | O | 30 |
| 42 | PE | F-phenyl-$CH_2$ | phenyl-CHI | H | S | 15 |
| 43 | BD/ST | $CH_3$-phenyl-$(CH_2)_4$ | phenyl-CHI | cyclopentyl | O | 25 |
| 44 | MMA/ST/AN, 65/20/15 | H | $CH_3$ | I-phenyl(I)-$CH_2$ | S | 25 |
| 45 | PMMA | naphthyl-Cl | phenyl-$CH_2$ | F-phenyl | O | 25 |
| 46 | PS | phenyl | phenyl | H | O | 10 |

*U.S. Patent No. 2,439,202.

We claim:
1. A flame-retardant composition consisting essentially of a thermoplastic polymer produced solely from ethylenically unsaturated monomers and a flame-retarding amount of a compound having the formula

$$R^2-\underset{\underset{R^1}{|}}{\overset{\overset{X}{\|}}{P}}-R$$

wherein R, R¹ and R² are, individually, selected from the group consisting of (A) hydrogen, (B) saturated alkyl radicals having from 1–6 carbon atoms, inclusive, (C) cyano, substituted alkyl radicals having 1–6 carbon atoms, inclusive, in the alkyl portion, (D) aryl radicals of 6–10 carbon atoms, inclusive, (E) aralkyl radicals of 7–11 carbon atoms, inclusive and (F) halo and polyhalo substituted aralkyl radicals of 7–11 carbon atoms, inclusive, and X is selected from the group consisting of oxygen and sulfur, no more than one of R, R¹ and R² being hydrogen.

2. A flame-retardant composition according to claim 1 wherein the thermoplastic polymer is a polymer of an α-olefin.

3. A flame-retardant composition according to claim 1 wherein the thermoplastic polymer is a polymer of a compound having the formula $$CH_2=\underset{\underset{R^3}{|}}{C}-\underset{\underset{R^4}{|}}{\overset{\overset{O}{\|}}{C}}$$

wherein R³ is selected from the group consisting of hydrogen and a methyl radical and R⁴ is selected from the group consisting of hydrogen and an alkyl radical having from 1 to 6 carbon atoms, inclusive.

4. A flame-retardant composition according to claim 1 wherein the thermoplastic polymer is a mixture of (A) a butadiene-acrylonitrile copolymer and (B) an acrylonitrile-styrene copolymer, the amount of A and B ranging from about 10–75% to 90–25%, respectively.

5. A flame-retardant composition according to claim 1 wherein said compound is dicyclohexylphosphine oxide.

6. A flame-retardant composition according to claim 1 wherein said compound is triphenylphosphine oxide.

7. A flame-retardant composition according to claim 1 wherein said compound is tris(2,4-dichlorobenzyl) phosphine oxide.

8. A flame-retardant composition according to claim 1 wherein said compound is tribenzylphosphine oxide.

9. A flame-retardant composition according to claim 1 wherein said compound is phenylbis(β-cyanoethyl)-phosphine oxide.

10. A flame-retardant composition according to claim 1, wherein said thermoplastic polymer is a polymer of a styrene.

References Cited
UNITED STATES PATENTS

| 2,837,494 | 6/1958 | Gilbert et al. | 260—45.7 X |
| 2,925,399 | 2/1960 | Schneider et al. | 260—893 |
| 3,076,034 | 1/1963 | Gordon | 260—45.7 X |
| 3,092,606 | 6/1963 | Ruppert | 260—45.7 X |

FOREIGN PATENTS 1,102,095  4/1961  Germany.

DONALD E. CZAJA, Primary Examiner.

M. J. WELSH, Assistant Examiner.

UNITED STATES PATENT OFFICE

CERTIFICATE OF CORRECTION

Patent No. 3,341,625  September 12, 1967

Helen Currier Gillham et al.

It is hereby certified that error appears in the above numbered patent requiring correction and that the said Letters Patent should read as corrected below.

Columns 5 and 6, TABLE I, second column, line 9 thereof, for 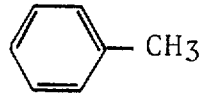 read 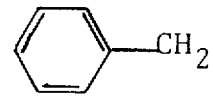

Signed and sealed this 12th day of November 1968.

(SEAL)
Attest:

Edward M. Fletcher, Jr.
Attesting Officer

EDWARD J. BRENNER
Commissioner of Patents